Dec. 1, 1931.  T. J. WATSON  1,834,561
ACCOUNTING MACHINE AND PUNCHING MECHANISM CONTROLLED THEREBY
Filed April 4, 1925  7 Sheets-Sheet 1

Inventor
Thomas J. Watson
By his Attorneys
Cooper, Kerr & Dunham

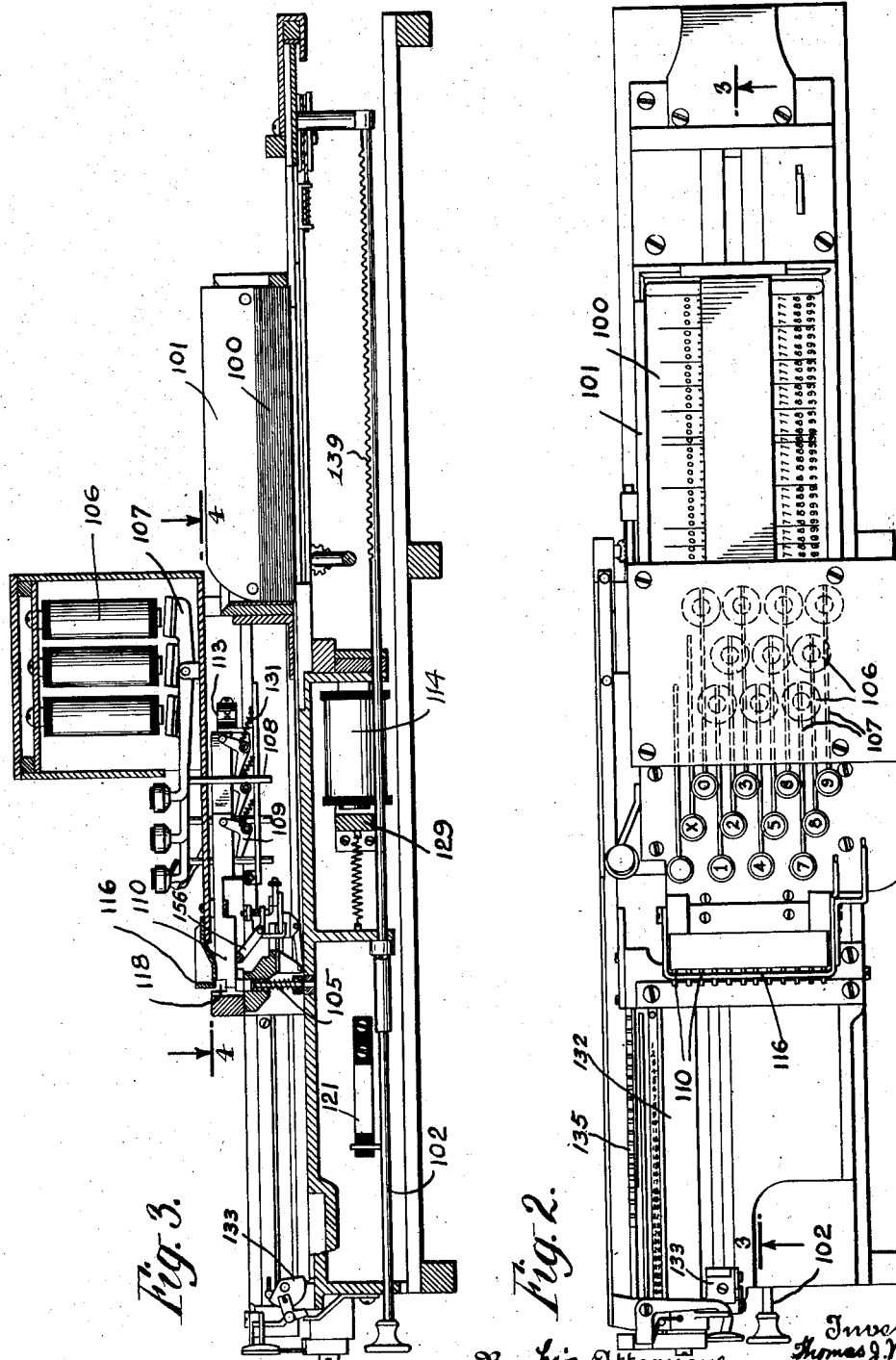
Dec. 1, 1931.  T. J. WATSON  1,834,561
ACCOUNTING MACHINE AND PUNCHING MECHANISM CONTROLLED THEREBY
Filed April 4, 1925  7 Sheets-Sheet 2

Dec. 1, 1931.  T. J. WATSON  1,834,561
ACCOUNTING MACHINE AND PUNCHING MECHANISM CONTROLLED THEREBY
Filed April 4, 1925   7 Sheets-Sheet 3
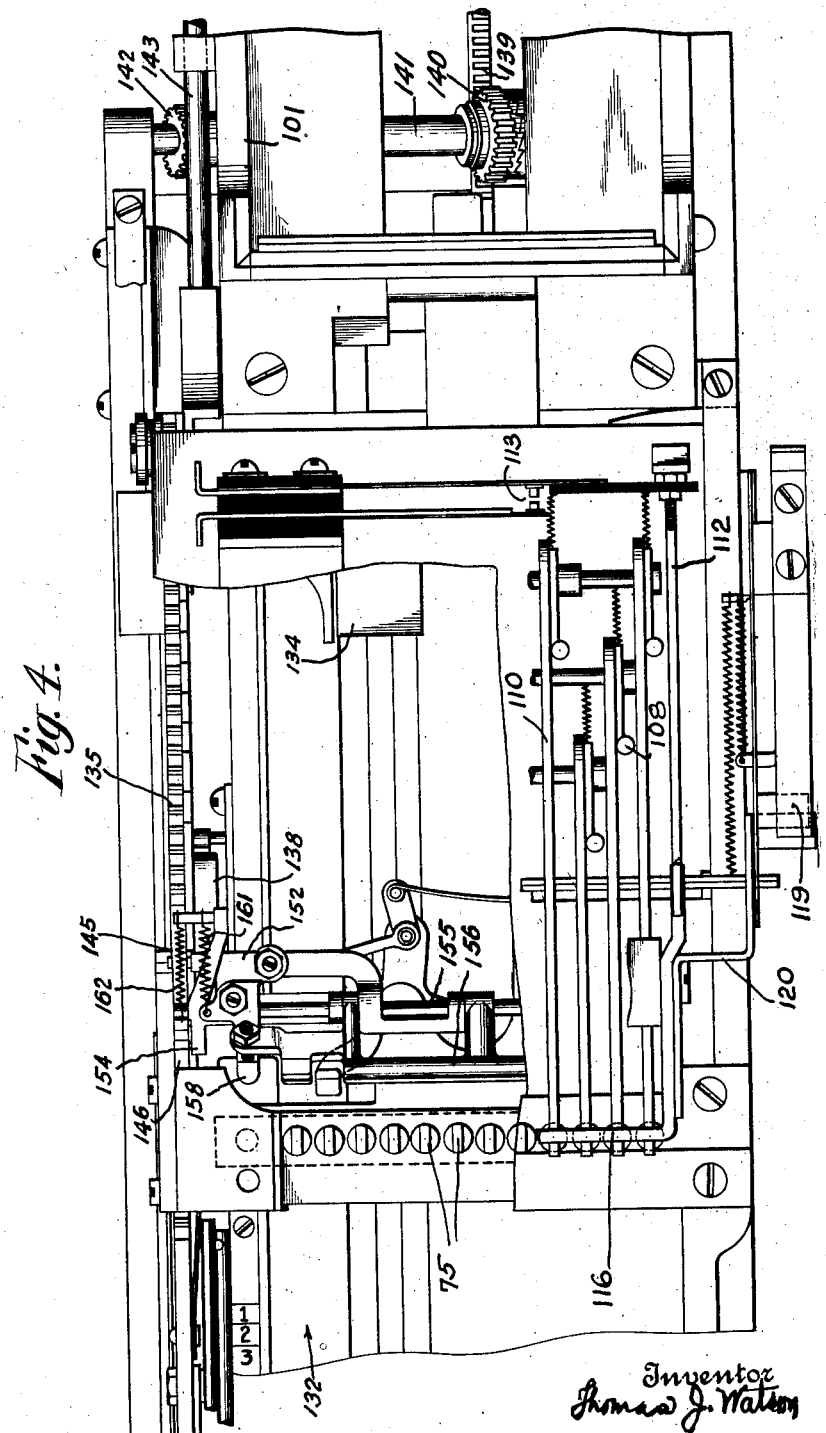

Dec. 1, 1931. T. J. WATSON 1,834,561
ACCOUNTING MACHINE AND PUNCHING MECHANISM CONTROLLED THEREBY
Filed April 4, 1925 7 Sheets-Sheet 4
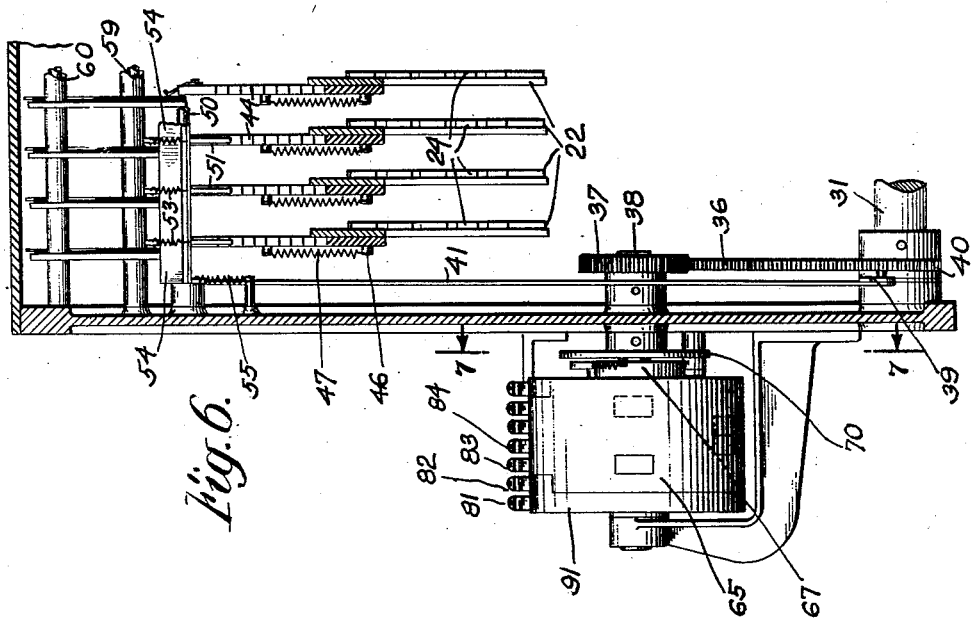
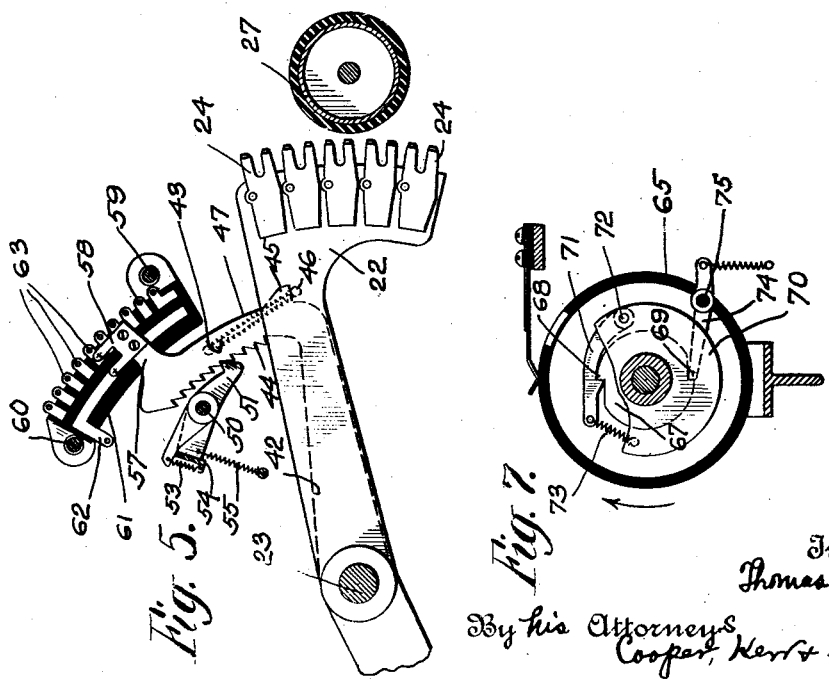
Inventor
Thomas J. Watson
By his Attorneys
Cooper, Kerr & Dunham

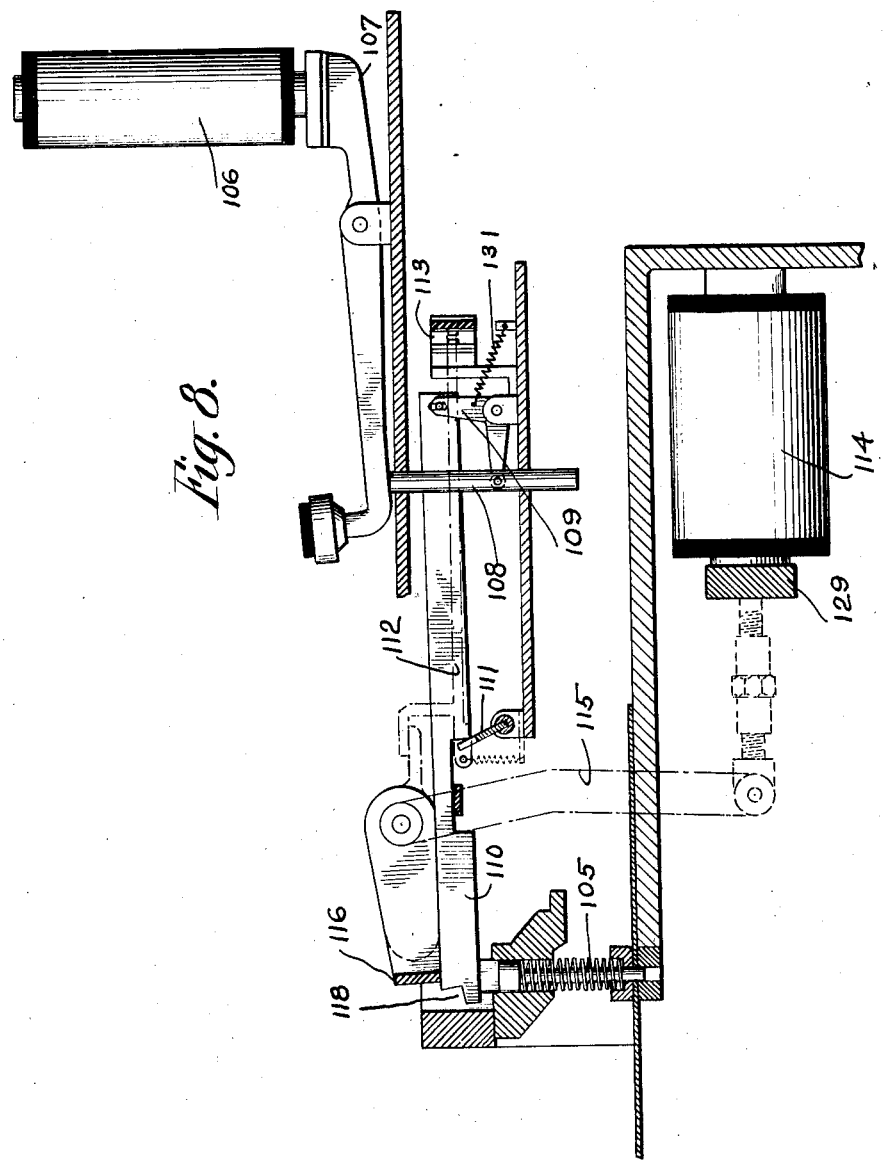

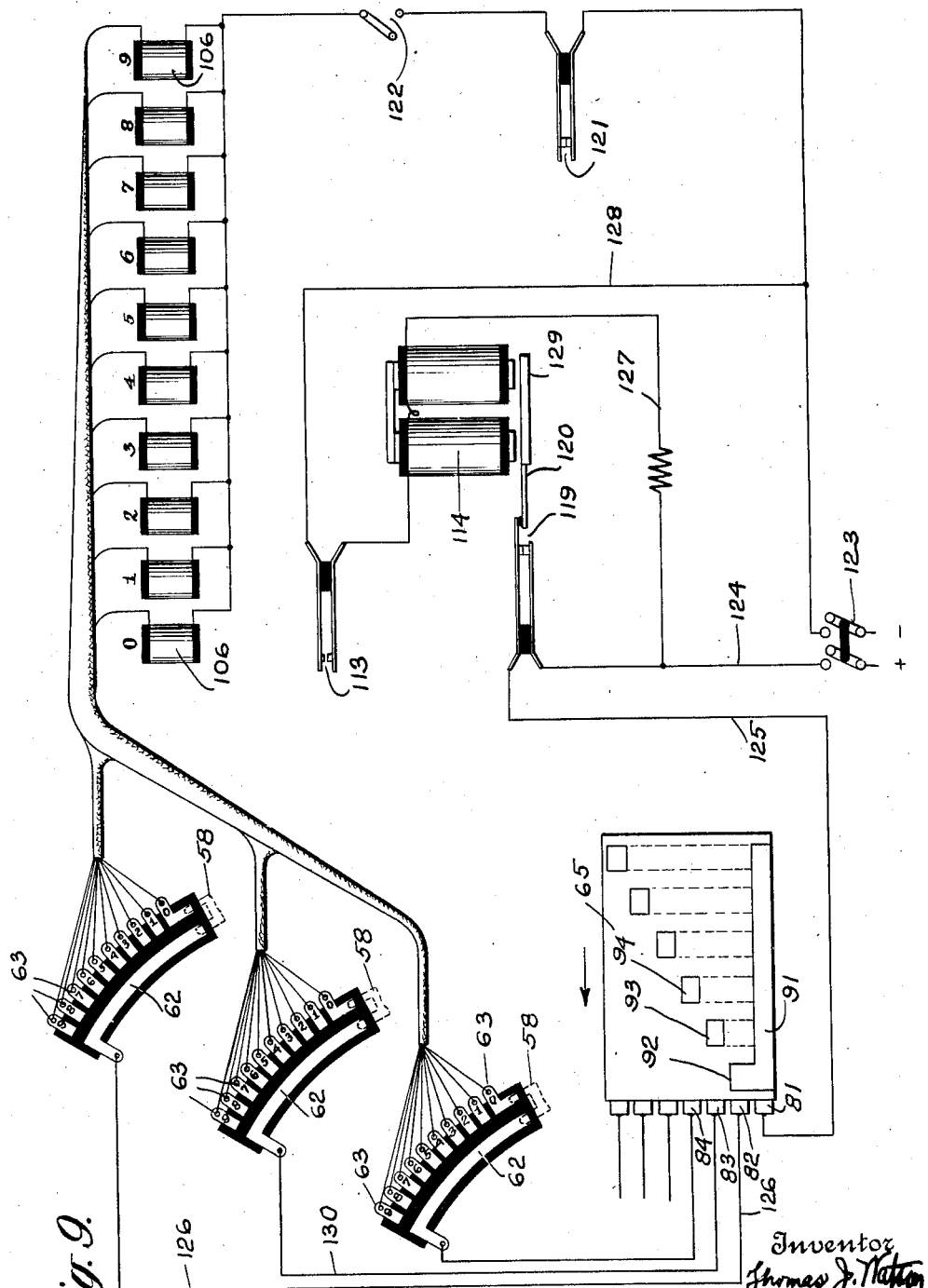

Dec. 1, 1931. T. J. WATSON 1,834,561
ACCOUNTING MACHINE AND PUNCHING MECHANISM CONTROLLED THEREBY
Filed April 4, 1925 7 Sheets-Sheet 7

Inventor
T. J. Watson
By his Attorney
W. N. Wilson

Patented Dec. 1, 1931

1,834,561

UNITED STATES PATENT OFFICE

THOMAS J. WATSON, OF SHORT HILLS, NEW JERSEY, ASSIGNOR TO THE TABULATING MACHINE COMPANY, OF ENDICOTT, NEW YORK, A CORPORATION OF NEW JERSEY

ACCOUNTING MACHINE AND PUNCHING MECHANISM CONTROLLED THEREBY

Application filed April 4, 1925. Serial No. 20,585.

This invention pertains to devices for punching record cards such as are used in Hollerith tabulating machines, and relates more particularly to improvements in the invention disclosed in my copending application, Serial No. 20,586 filed April 4, 1925, which covers apparatus for punching record cards concurrently with the operation of a cash register. In my copending application above referred to the form of cash register utilized was that of the press down key type.

One of the objects of the present invention resides in the provision of means whereby an accounting machine of the so-called two motion type may be utilized to control the operation of a punching device. Accounting machines of this type which may be cash registers, for example, of the key set crank operated type, or adding machines of the key set handle operated type, usually include a plurality of keys which are set up initially in accordance with the amount which is to be entered upon the register. After the setting of the keys is made the crank or handle or other actuating mechanism as the case may be is brought into operation, which operation brings about an entry of the amount set up by the keys into the registering devices. According to the present invention provision is made for controlling the operation of a punching mechanism in accordance with the amounts set up by the keys and according to the preferred embodiment of the invention this control is secured by and during the period that the item is being entered into the register by the actuating mechanism under the control of the previously set keys.

A further object of the present invention is to provide a punching attachment which may readily be applied to two motion types of accounting machines now in use. Provision is made for controlling a punch of known form to successively select and effect punching in multi denominational columns of amounts entered into the register of the accounting machine.

A further object of the present invention resides in the provision of means for controlling a ten digit punching mechanism by and in accordance with the operations of a double motion accounting machine.

A further object of my present invention is to provide a device which will permit adding machines of known type to be used in connection with card punches of known type, the operation of the punch being controlled through supplementary devices which I provide between the adding machine and the punching machine.

When the adding or accounting machine is used in the usual manner, the forward motion of the operating handle sets up contacts which control circuits to the punching device, and the back stroke of the handle causes the numerals representing the amount set up in the adding machine to be automatically punched in appropriate columns in the card, thereby making a permanent perforated record of the amount.

In the drawings,

Fig. 2 is a top plan view of a card punching machine of a well known type.

Fig. 3 is a sectional side elevation of the punching machine on line 3—3 of Fig. 2.

Fig. 4 is an enlarged plan of a portion of the punching machine on line 4—4 of Fig 3.

Fig. 5 shows a type sector of the adding machine together with contact devices.

Fig. 6 is an elevation, partly in section, of a portion of the adding machine on line 6—6 of Fig. 1 showing commutator.

Fig. 7 is a view of commutator taken on line 7—7 of Fig. 6.

Fig. 8 is a sectional side elevation of a portion of the punching device showing magnets.

Fig. 9 is a diagram of the electric circuits.

Figure 1:
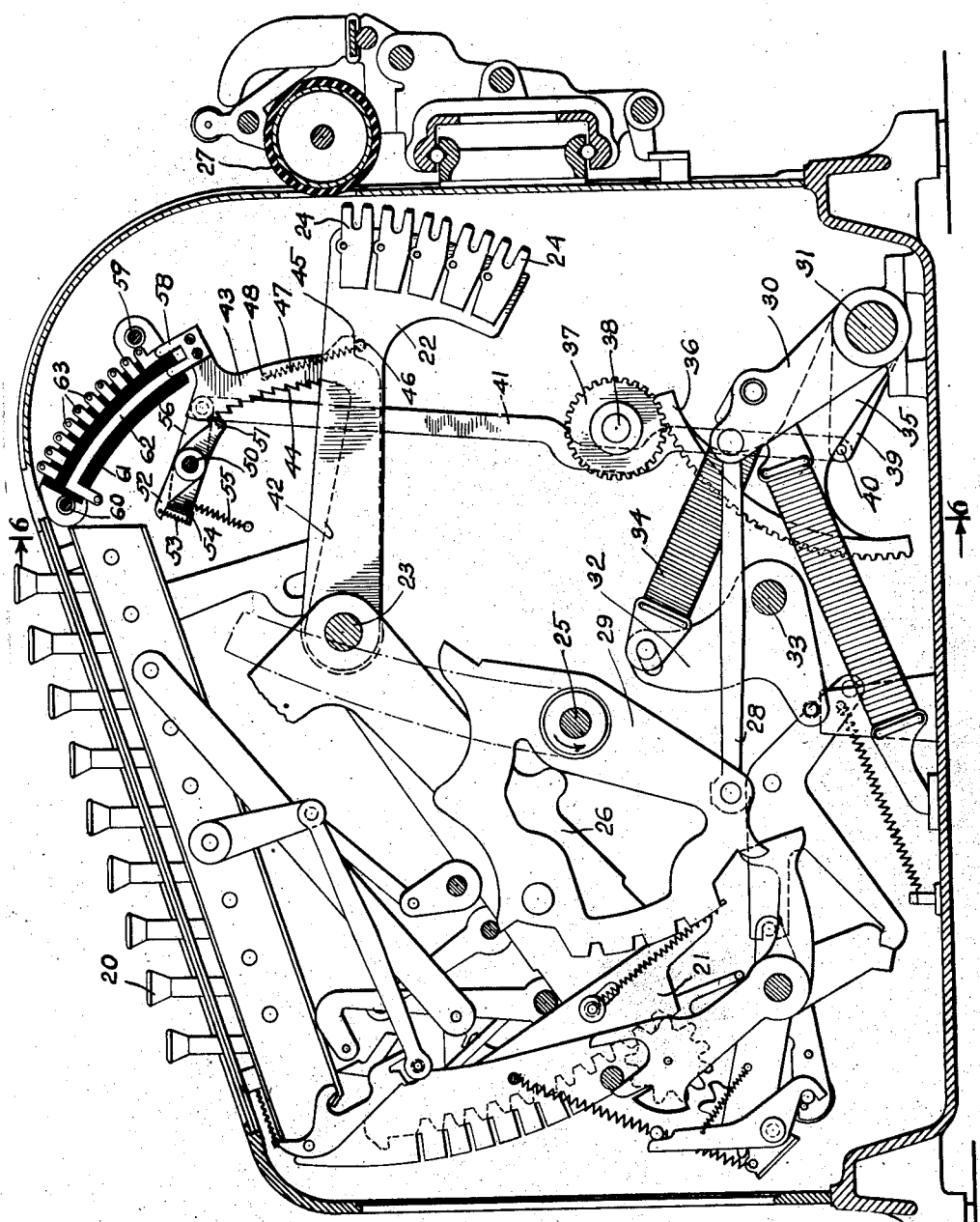
Fig. 1 is a vertical cross section of a typical adding machine with the addition of the contact devices pertaining to my invention, with all parts in home position.

In the typical adding machine which I have used for purpose of illustration, depression of keys 20 positions stops which determine the extent of movement of segmental racks 21 which are mounted on the forward ends of levers 22, which are loosely hung on cross shaft 23 and carry at their segmental rear ends a series of type plates 24 bearing type for printing numerals.

The operating handle of the machine is mounted on shaft 25 and when it is drawn forward, frame 26, carried on shaft 23, is lowered, and racks 21 associated with any banks of keys in which keys have been depressed, will follow frame 26 until they bring up against stops set by the depressed keys. The same operation raises arms 22 and positions type opposite platen 27 for the printing of the amount represented by the depressed keys. The printing is effected as the handle reaches the end of its forward stroke, by pivoted hammers, not shown, striking type plates 24.

When shaft 25 is rocked by the operating handle in the direction indicated by the arrow, link 28 is pushed rearwardly by member 29, fast on shaft 25. The rear end of link 28 is connected to the upper end of arm 30, pivoted on shaft 31. Member 32, fast on shaft 33, which is the main shaft of the machine, is connected to the upper end of arm 30 by the coil spring 34, so that when the handle is drawn forward shafts 31 and 33 are both rocked clockwise, and when the handle is returned to its home position both shafts rotate counterclockwise to their normal positions, and type carrying member 22 drops to its lowest position, as shown in Fig. 1.

The purpose of the resilient connection from arm 30 to member 32 is to prevent possible shock from the operating handle being communicated to main shaft 33, and through shaft 33 to the delicate working parts of the machine.

Having explained such parts of the adding machine as are essential to an understanding of my invention, I shall now describe the parts and devices I have added to carry out the purposes of my invention.

Fast on shaft 31 is an arm 35 carrying the sector gear 36, in mesh with pinion 37 on shaft 38. Pivoted on shaft 31 is the arm 39 having at its outer end a pin 40 on which is pivotally supported the vertical link 41.

Alongside each type sector 22 is a member 42 pivoted on shaft 23. Member 42 has arcuate portion 43 on the inner edge of which is a series of teeth 44, each tooth corresponding to a type 24. In normal position a shoulder 45 on member 42 rests on pin 46 fast in sector 22. A spring 47 extends from pin 46 to a pin 48 in the arcuate portion 43 of member 42.

Pivoted on shaft 50 is a pawl 51 having a tail 52 connected by spring 53 to bail 54 which is fast on shaft 50 and is pulled downwardly by spring 55. Fast to shaft 50 and extending rearwardly is the arm 56, to which is connected the upper end of vertical link 41.

Mounted on a radial projection 57 (see Fig. 5) of member 42 is a bifurcated contact piece 58. Supported on rods 59 and 60 is an arcuate non-conducting block 61, there being one block 61 corresponding to each member 42. Each block 61 has imbedded in it a common contact strip 62, and a series of ten contact blocks 63. Strips 62 and blocks 63 are so positioned that when member 42 rotates about shaft 23 the outer finger of piece 58 will traverse blocks 63 and the inner finger will contact continually with strip 62.

Mounted on shaft 38 is a rotatable commutator comprising an outer non-conducting shell 65 with contact strips and blocks imbedded therein, and a hub 67 having notches 68 and 69. Along side of the commutator, and fast to shaft 38, is a disc 70 carrying dog 71 pivoted at 72 and drawn inwardly by spring 73. A dog 74, pivoted to the machine frame at 75, co-operates with dog 71 in controlling the rotation of the commutator, as will be explained later.

Bearing on the surface of the commutator is a series of contact brushes 81, 82, 83, 84, etc. When the commutator rotates, brush 81 is in contact with common strip 91, and the other brushes make contact successively with the contact blocks 92, 93, 94, etc. (Fig. 9.)

The punching mechanism is of a type well known in the art, in which a stack 100 of cards to be punched is placed in magazine 101. As a preliminary to operating the punch the operator draws out the rod 102 which carries one card from the bottom of stack 100, forward into the punching section of the machine.

Thereafter, when the keys are manipulated by the operator the card is advanced forward one column at a time by the usual escapement mechanism, the escapement operating at each punching operation. These parts are well known in punching devices of this kind. After the card is punched the operator withdraws the card at the left end of the machine, re-operates pull-rod 102, and punches the next card.

Figure 10:
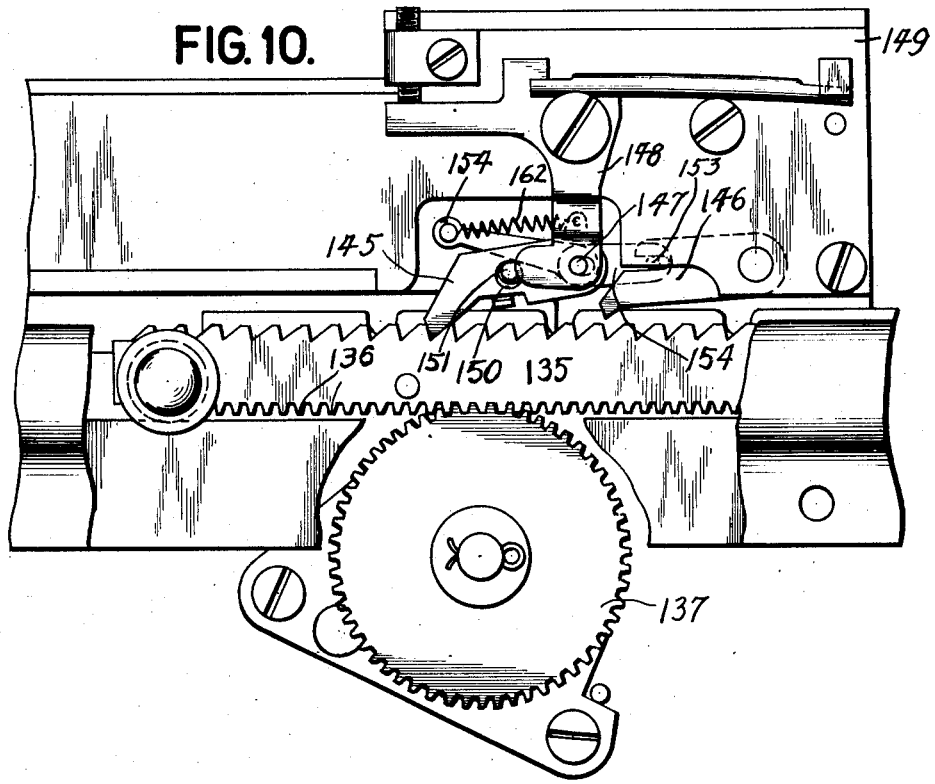
Fig. 10 is an elevational detail view of the punch escapement mechanism.
Figure 11:
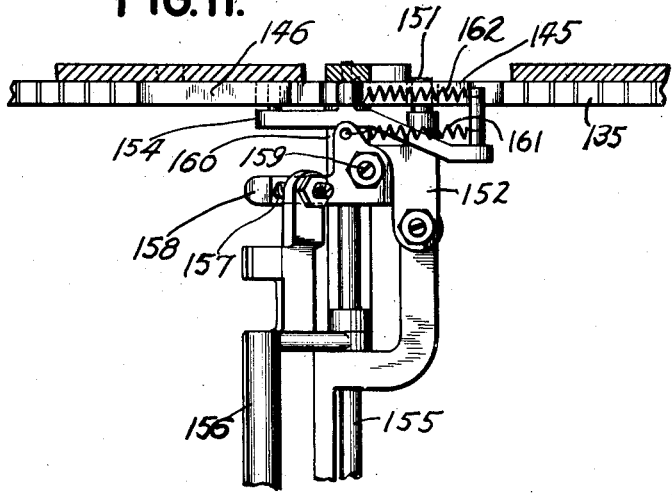
Fig. 11 is a plan detail view of the escapement mechanism.

In the embodiment I have shown in my drawings I provide 12 punches 105, placed in a row across the device, each punch corresponding to a particular index position on the card. Corresponding to each digit punch is a selecting magnet 106. These magnets, when one is energized, effect the selection of the punches in the following manner. Referring to Fig. 8, a selecting magnet 106, when energized, attracts its armature 107, thus depressing plunger 108, which acts through bell crank 109 to thrust forward an interposer bar 110 to a position above its corresponding punch 105. The forward movement of any interposer bar rocks a bail 111 which pulls link 112 forward and closes contact 113. This establishes a circuit to the main punching magnet 114, which, through arm 115, rocks bail 116 downwardly. Bail 116 is directly over the row of punches 105 and when rocked downwardly depresses any interposer bar or bars which have been moved forward by their selector magnets, and thereby forces the corresponding punch or punches through the card. Punches whose interposer bars have not been thrust forward will not be affected, as they will be in the position shown in Fig. 3, with the clearance notch 118 under the bail. The interposer bar is restored to initial postion by a spring 131 (Fig. 3). The depression and return to initial position of an interposer bar is also utilized to operate the escapement mechanism. The card while in punching position is held on the surface of frame 132 by a gripper 133 at the forward end (see Figs. 2 and 3) and an abutment 134 at the rear end (Fig. 4). Both the gripper 133 and abutment 134 are rigid with the escapement bar 135 (Figs. 2, 4, 10 and 11). Thus, movement of the escapement bar will through gripper 133 and abutment 134 advance the card. The escapement bar is provided on its lower edge with rack teeth 136 which mesh with a pinion 137 of an ordinary spring motor 138 (Fig. 4). When rod 102 is pulled out to bring a card from the magazine 101 into the punching section, rack teeth 139 at the right end of the rod (see Figs. 3 and 4), rotate pinion 140 on a shaft 141 which carries a pinion 142 meshing with teeth on the bottom of a rod 143 rigidly carried at the rear end of the escapement bar (see Fig. 4). Rotation of pinion 142 results in movement of the escapement bar towards the right (as viewed in Fig. 4). Through teeth 136 on the escapement bar and pinion 137, the spring drum 138 is thereby tensioned. The movement of the escapement bar to the right is permitted by escapement pawls 145 and 146 (see Figs. 4, 10 and 11). Escapement pawl 145 is loosely pivoted on pin 147 of a stationary member 148 while pawl 146 is directly pivoted on frame 149. Pawl 145 has a slot 150 in which is loosely seated a pin 151 of a member 152 (Figs. 4 and 10). Pawl 146 has a notch at the free end in which is a pin 153 on a member 154. Member 152 is freely rotatable on shaft 155 which also freely carries a bail 156 provided with a screw 157 bearing on an extension 158 of member 152. Member 152 in turn has a screw 159 which bears on an extension 160 fixed to member 154, the screw 159 and extension 160 being held in contact by spring 161. Thus when bail 156 rocks to the left as viewed in Figs. 3, 4 and 11, it depresses extension 158 moving pin 151 on member 152 upwardly while the latter through screw 159 moves member 154 and pin 153 thereof downwardly. Referring to Fig. 10, it is seen that upon movement of pin 151 upwardly, pawl 145 will be lifted out of engagement with the escapement teeth on rack 135 while downward movement of pin 153 moves pawl 146 downwardly into contact with the escapement teeth before the escapement rack is released by pawl 145. Bail 156 extends beneath all the interposer bars. Thus when one of the latter is depressed during a punching operation, the bail 156 is moved downward as may be understood from Fig. 3. The completion of the downward movement of bail 156 finds pawl 145 released from the escapement rack. A spring 162 between the member 154 and the pawl 145 (Figs. 4, 10 and 11) moves the pawl 145 forwardly after it has been raised, this movement being permitted due to the play between pin 151 and slot 150 of the pawl 145 and the loose pivoting of the latter. The pawl 145 is thereby positioned on top of the next tooth of the escapement rack.

When the depressed interposer bar is restored to initial position, bail 156 rocks upwardly and member 152 follows. The pin 153 is raised due to this action before the pin 151 is depressed. When pin 153 is raised, pawl 146 is released from the escapement rack and the latter is advanced one tooth space from its previous position by spring motor 138 acting through pinion 137 after which the pawl 145 drops into the next tooth notch and holds the escapement against further movement. The card is thereby advanced one column each time a punching operation is effected. The movement of bail 116 is also utilized to open contact 119 (Figs. 4 and 9), actuation being effected by bracket 120 fixed to bail 116. The purpose of contact 119 will be explained later. 121 is a pull-rod contact which cuts out the punch-selecting magnets while pull-rod 102 is being operated in order to prevent punching operations during that time. Switch 122 may be used to break the punching circuit when it is desired to operate the adding machine without punching.

Whenever the keys 20 of the adding machine have been depressed and the operating handle pulled forward, type sectors 22 are set, and the amount printed on paper on platen, 27, as previously described. During the above operation each type sector elevates its contact carrying member 43 and its contact piece 58 is positioned so that its outer finger is in contact with the block 63 which corresponds to the type aligned with the printing platen, as shown in Fig. 5. While the handle is moving forward, gear sector 36 swings clockwise and rotates pinion 37 and its shaft 38 counter-clockwise. Disc 70 which is fast to shaft 38 also turns counter-clockwise, but on account of the arrangement of dogs 71 and 74 the commutator does not rotate. Arm 35 having been removed from pin 40, rod 41 is raised by spring 55, bail 54 is lowered, and each pawl 51 is free to engage a tooth 44 in sector 43.

On the back (return) stroke of the operating handle type sectors 22 drop to home position, but contact members 42 are held in raised position by pawls 51, the springs 47 stretching to allow 22 to drop and 42 to remain elevated. This means that contact is maintained by contact piece 58 between its block 63 and strip 62 during the back stroke of the handle. During this period pinion 37, shaft 38, and flange 70 are rotating clockwise and carrying the commutator with them, so that impulses are sent successively through the thousands, hundreds, tens, units, etc., contacts, thus energizing successively the corresponding selector magnets 106 and punching holes successively in the thousands, hundreds, tens, units, etc., columns in the record card, which has been placed in proper position in the punching device.

The scheme of operation can readily be understood by referring to circuit diagram, Fig. 9, in which current is admitted to the line by switch 123. When commutator 65 is rotated, in the direction indicated by the arrow, and brushes 81 and 82 come simultaneously into contact with strip 91 and block 92, current flows through line 124, contact 119, line 125, brushes 81 and 82, line 126, upper contact sector 62, contact piece 58, contact block 63, through its corresponding selector magnet 106, switch 122, contact 121, and back to source. At the same time part of the current flows through line 127, magnet 114, contact 113 (which has been closed by the interposer actuated by appropriate magnet 106), and back to the source by line 128. When magnet 114 is energized, armature 129 is actuated, and the punch is driven through the card by bail 116, Fig. 8, as previously described. At the same time bracket 120 breaks contact 119 and current through magnet 106 is interrupted and the interposer bar is permitted to be restored by spring 131.

After the first punching operation is completed as described above, commutator 65, continuing to rotate, brings contact strip 91 and 93 into contact with brushes 81 and 83 and a circuit is established through line 130, whereupon the proper punch is actuated in the second column of the record card, which, during the interval between commutator contacts 92 and 93 has been moved one column further along. For the purposes of illustration the commutator 65, see Fig. 9, covers six columns, in order to cover a given zone of six columns on the card. In punching so-called Hollerith tabulating cards it is necessary to punch out the zeros. In transferring a number of three digits, such as 3.54 the first three contact plates 92, 93 and 94 of the commutator 65 would punch zeros and the last three contact plates would punch 3.54 in their proper order. Thus, when a number of three digits is selected by the keys 20, the contact pieces 58 of the first three denominational order columns will be moved to corresponding positions. The last three denominational orders not having been selected, the contact pieces 58 of these latter orders will remain in lowermost or zero position. Thus, where only a three digit number has been selected, the contact pieces 58 of the remaining three higher order columns will be in the positions shown in Fig. 9 illustrating the punch selectors of the latter columns. The circuit through the highest order column is through line 124, contact 119, line 125, brushes 81 and 82, line 126, contact strip 62, contact piece 58, block 63 marked "0", and magnet 106 marked "0". The latter will cause operation of the punch in "0" position in the highest order column of the number-receiving portion of the card in the punching machine. Similarly, the next two lower order columns of the card will receive perforations in their "0" position.

While there has been shown and described only one embodiment of the invention, it is understood that changes and modifications may be made within the scope of the invention without departing from the spirit thereof. I therefore wish to be limited only by the following claims.

I claim:

1. In an apparatus of the character described in combination, an accounting machine including a plurality of item selecting members and an operating member having an initiating stroke and a restoring stroke, a record punching device associated with said accounting machine including a plurality of punches and dies therefor, electrical actuating means for relatively moving said dies and said punches and means conjointly controlled by said selecting members and said operating member during its initiating stroke for selecting said actuating means for operation in accordance with the operation of the accounting machine, and means controlled by said operating member during its restoring stroke for operating the selected actuating means.

2. In an apparatus of the character described in combination, an accounting machine including a plurality of item selecting members and an operating member having an initiating stroke and a restoring stroke, a record punching device including a plurality of punches with electromagnetically operated actuating means for each, a control circuit for each actuating means each including controlling contacts, a movable contact device moved by said operating member in its initiating stroke to successively engage said controlling contacts, means controlled by said selecting members for temporarily arresting said movable contact to select one of said controlling circuits and means controlled by said operating member during its restoring operation for energizing the selected circuit.

3. In combination with an accounting apparatus having registering means, numeral keys for setting up an amount to be registered and an operating member other than said numeral keys which when operated enters the items set up by said keys in said registering means, a punching attachment mechanically separate from said accounting apparatus, electrical control circuits extending from said accounting apparatus to said punching attachment to control the selection of the punches therein, and means brought into action by the operation of the operating member for selectively energizing the punch control circuits in accordance with setting of the keys of the accounting machine.

4. In combination with a key set handle operated accounting machine having recording devices arranged to receive an entry of an item set up by the keys upon the operation of the handle, a punching device with punches for punching tabulating cards with the items recorded in said accounting machine, a plurality of magnets in said punching attachment for selecting the punches for operation, and means controlled by the numeral keys of the accounting machine and brought into action by the operation of the operating handle thereof for selectively energizing the said magnets for the purpose described.

5. In combination with a key set handle operated accounting machine having registering devices arranged to receive an entry of an item set up by the keys upon the operation of the handle, a punching device with punches for punching tabulating cards with the items registered in said accounting machine, and means for electrically controlling the selection of the punches, said means being brought into operation by the operation of the handle of the accounting machine and under the control of the numeral keys for selecting the punches which are to operate in the punching attachment.

6. In combination with a key set handle operated accounting machine having registering devices arranged to receive an entry of an item set up by the keys upon the operation of the handle, a punching device with punches for punching tabulating cards with the items registered in said accounting machine, means for electrically controlling a selection of punches corresponding to one denominational order of an item entered in the accounting machine, means for thereafter automatically initiating a punching operation, and means for thereafter making a punch selection corresponding to another denominational order and for subsequently automatically operating the selected punch, the aforesaid selection of punches being brought into action by the operation of the handle of the accounting machine under the control of the depressed numeral keys.

7. In an accounting machine having a totalizer, a keyboard having a plurality of item selecting means, an operating mechanism for driving the totalizer under the control of the keyboard, a punch for each of the ten digits, mechanism controlled jointly by the keyboard and operating mechanism for setting up amounts to be punched, and punch operating devices controlled by the setting up mechanism for operating the ten digit punches to punch successively in columns of different denominational orders.

8. In combination with an adding machine, a punch-press having a plurality of punches, means for moving the punches to punch record blanks supplied thereto, and means controlled by the adding machine and including a plurality of switches in the adding machine and connections therefrom to the said punch moving means for automatically selecting the punches corresponding to the characters recorded by the adding machine and automatically performing the punching operation in accordance with the selected punches when the adding machine is operated.

9. In combination with an adding machine, a punch-press having a plurality of punches and a cooperating die, means for moving the punches to punch record blanks supplied thereto, means including a plurality of switches in the adding machine and connections therefrom to the said punch moving means for automatically selecting the punches corresponding to the characters recorded by the adding machine and setting the same to the punching position, and means controlled by the adding machine for automatically performing the punching operation in accordance with the selected punches by causing a relative approaching movement between the punches and die when the adding machine is operated.

10. In combination with an adding machine, a punch-press having a plurality of punches and a cooperating die, means for moving the punches to a position adapted to punch record blanks supplied thereto, means including a plurality of switches in the adding machine and connections therefrom to the said punch moving means for automatically selecting the punches corresponding to the characters recorded by the adding machine and setting the same to the punching position, means for controlling the operation of the adding machine, a switch in the said connections adapted to be closed by the operation of the last named means in a manner completing such connections where the key switches are closed and thereby setting the corresponding punches, a power element, means operated thereby for feeding record blanks through the punch press between the punches and die and for causing a relative approaching movement between the punches and die to punch the blank therebetween, means whereby the last said means is caused to function by the means which controls the operation of the adding machine, and means for automatically releasing the set punches after the punching operation.

11. In a device of the class described, in combination, an electrically controlled card punching apparatus including a plurality of punch selector magnets, a plurality of differential actuators for various denominational orders, and means controlled in accordance with the setting of the differential actuators for selecting circuits to the punch selector magnets for the purpose described.

12. In a combined item registering and card punching apparatus, a card punching device having provisions for punching a card by a series of successive punching operations, each operation effecting the punching of a different denominational order in a different column of the card, an item registering apparatus including differential actuators corresponding to different denominational orders, and punch selectors connected to and operated by said differential actuators for controlling said successive punching operations in accordance with the setting of said differential actuators.

13. Mechanism for associating a punching device with a register device, comprising a primary punch selector, a secondary punch selector, and punch operating means commonly controlled by both of said selectors for a punch operation in accordance with the operation of said register.

14. Mechanism for controlling the operation of a punching device by a register device including a plurality of differential actuators for entering items in the register, comprising a plurality of punch selectors controlled separately by corresponding differential actuators, and a punch selector cooperating with each of the first-mentioned punch selectors for controlling the selection of punches for any one punching operation.

15. In a combined punching and register device, a plurality of punch selectors controlled in accordance with the operation of said register device and a punch selector cooperating successively with each of the first-mentioned punch selectors for controlling the punching operation in accordance with the entries in said register.

16. In a combined punching and register device, a plurality of punch selectors for initiating the selection of punches in accordance with the operation of said register, means for completing the selection of the punches initiated by aforesaid selectors, and means for operating the punches in accordance with the completed selection.

17. In a combined punching and register device, a plurality of punch selectors for initiating the selection of the punches in accordance with the operation of the register, means successively coacting with each of aforesaid selectors for completing the selection of the punches, and means for operating the selected punches.

18. In a combined register device and punching apparatus for punching a record card having a plurality of different columns and a plurality of different punch mark positions in each column, means controlled in accordance with the operation of said register for determining the position of the punch marks in the columns, and means controlled in accordance with the operation of said register for subsequently determining the column in which a particular punch mark is made.

19. In a combined punch and register device wherein said device includes an item entering means comprising a plurality of differential actuators, primary punch selectors controlled in accordance with the operation of said differential actuators and a secondary punch selector subsequently controlled in accordance with the operation of the register device, the punch selection being commonly determined by both of said selector means.

20. In a combined register and punch, the register including item entering means, devices for selecting the punches in accordance with the operation of the entering means and means for determining the order of operation of said devices to control the operation of said selected punches.

21. In a combined punch and key controlled machine; punching means, electrical means including separate electric circuits for operating the punches, means cooperating with the keys of said machine for selectively and partially closing said circuits, and means for completing the closure of said circuits to effect operation of the punches.

22. In a combined punch and accounting machine in which the latter includes item selecting members; punching means, electrical means including separate electric circuits for operating the punches, means controlled by said item selecting members for closing a normally open part of said circuit, and means for successively closing other open parts of said circuits to complete the circuits and effect punch operation.

23. In a combined punch and register wherein the latter includes a plurality of item entering means, electrical punch operating means including separate electric circuits, each of which effects operation of a corresponding punch, means controlled in accordance with the operation of said item entering means upon making an entry for selecting said circuits for operation and means controlled in accordance with the operation of said register upon completion of said entry for successively rendering said circuits effective.

24. Mechanism for associating a punching device with a register device, comprising a primary punch selector, a secondary punch selector, punch operating means including solenoids and circuits therefor commonly controlled by both of said selectors, and means operated by said solenoids for effecting the punch operation in accordance with the operation of said register device.

25. In combination with an accounting machine provided with denomination order devices each differentially operable and selectors for differentially controlling the operation of said devices, punches and dies for perforating the record sheet therebetween, and electric circuits including switches controlled by the accounting machine in accordance with the differential setting of the differential devices for causing selective operation of said punches to perforate the aforesaid record sheet.

26. In an apparatus of the class described, an accounting machine having an operating cycle comprising an initiating operation and a restoring operation, a record punching device comprising electrically operated actuating means, controlling means therefor including a plurality of control contacts with selecting means operated in accordance with the operation of said accounting machine by said accounting machine during its initiating operation and energizing means for said actuating means controlled by said contacts and operated by said accounting machine during its restoring operation.

27. In an apparatus of the class described, an accounting machine having an operating cycle comprising an initiating operation and a restoring operation, a record punching device including a plurality of punch actuators and operating electromagnets therefor, means controlled by said accounting machine during its initial operation for selecting said electromagnets for operation in accordance with the operation of the accounting machine and means controlled by said accounting machine during its restoring operation for operating the selected electromagnets.

28. In a device of the character described, in combination, an electrically operated card punching apparatus, a registering apparatus having a two-stroke operating cycle, and means controlled by said registering apparatus during the first stroke of a cycle in accordance with the differential setting for selectively controlling the operation of the punching device and means controlled by the registering apparatus during the second stroke of said cycle for operating said punching device.

29. In combination with an accounting machine having a keyboard, totalizing devices, means controlled by the keyboard for setting up in the machine and entering into the totalizer mechanical representations of various items set up on the keyboard, a punching device having a punch for each of the ten digits, a support for the cards to be punched, devices for effecting a relative movement of the support and the punches to bring different columns on the card in punching relation with the punches, and punch operating mechanism controlled by the aforesaid means for selectively operating the punches to punch any column before the next column on the card is brought into punching relation with said punches.

30. In a machine of the class described, the combination with a totalizer, of a set of contact points for each denominational order, key-controlled differential devices for driving the totalizer and temporarily setting up on the contact points each of the amounts registered, a punch for each of the ten digits, means for selectively operating the punches under the control of the contact points to punch in the different denominational columns on a card, devices comprising an escapement mechanism for establishing punching relation between the punches and the successive columns on the card, and devices for suppressing the control of the punches from the contact points representing one denominational order before a selection is made from the contact points representing another denominational order.

31. In combination with an accounting machine, a punch-press having a plurality of punches and cooperating dies, means for moving the punches and dies relatively to punch record blanks supplied thereto, means including a plurality of switches in the accounting machine and connections therefrom to the said punch moving means for automatically selecting the punches corresponding to the characters recorded by the accounting machine, and means controlled by the accounting machine for timing the operation of the selected punches by the first-named means.

32. In combination with an accounting machine, a punch-press having a plurality of punches and a cooperating die, means for moving the punches and die relatively to punch record blanks supplied thereto, means including a plurality of switches in the accounting machine and connections therefrom to the said punch moving means for automatically selecting the punches corresponding to the characters entered in the accounting machine, means for controlling the operation of the accounting machine, and a switch in the said connections adapted to be closed by the operation of the last-named means in a manner completing such connections where the first-named switches are closed and thereby setting said first-named means in operation to move the punches and die relatively to punch the blank in accordance with the selected punches.

33. An accounting machine including a plurality of denominational order elements each including a differentially settable element and a switching mechanism positioned in accordance with the differential setting of its associated settable element and a punching mechanism of the successive column punching type, and electrical circuits extending between the punching mechanism and the switching mechanism to control the punching mechanism to perforate records by successive columnar punching in accordance with the setting of the differentially settable elements.

34. An accounting machine including a plurality of denominational order elements each including a differentially settable element and a switching mechanism including a member differentially positioned in accordance with the setting of said settable element, a punching mechanism for perforating records to represent different data, said punching mechanism including punch control selecting magnets, and electrical circuits extending between the aforesaid switching mechanism and said punch control selecting magnets to control the latter so that the punching mechanism perforates a record according to the data set up by the setting of the differentially settable elements.

In testimony whereof I hereto affix my signature.

THOMAS J. WATSON.